United States Patent [19]

Boudan et al.

[11] Patent Number: 5,262,947
[45] Date of Patent: Nov. 16, 1993

[54] PROCESS FOR MEASURING A PHYSICAL QUANTITY HAVING A RANDOM AND PULSE-LIKE CHARACTER

[75] Inventors: Marc Boudan, Rueil Malmaison; Alain Pailhes, Lamanon, both of France

[73] Assignee: Electricite de France Service National, France

[21] Appl. No.: 558,064

[22] Filed: Jul. 26, 1990

[30] Foreign Application Priority Data

Jul. 26, 1989 [FR] France ................... 89-10074

[51] Int. Cl.⁵ ................... G06F 15/00; G01T 1/20
[52] U.S. Cl. ................... 364/413.24; 250/366; 328/109
[58] Field of Search ................... 364/413.13; 328/109, 328/116; 250/366, 369

[56] References Cited

U.S. PATENT DOCUMENTS

3,634,688  1/1972  DiRocco ................... 250/71.5 R
4,862,004  1/1989  Koike et al. ................... 250/369

FOREIGN PATENT DOCUMENTS

0235985  2/1987  European Pat. Off.
1411207  6/1975  United Kingdom.

OTHER PUBLICATIONS

"Nonlinear Scintillation Response of Thin Na1(TI) Crystals" by T. Tojo, Nuclear Instruments & Methods in Physics Research, vol. A-238, (1985) 15 Jul., pp. 153 to 159.

Primary Examiner—Roy N. Envall, Jr.
Assistant Examiner—Frantzy Poinvil
Attorney, Agent, or Firm—Hayes, Soloway, Hennessey & Hage

[57] ABSTRACT

A process for measuring a physical quantity with a random and pulse-like character, or which is transformable into pulse form is made of a measuring chain, which supplies a result relative to the quantity. An iterative mathematical simulation is carried out taking into account the random variable character of the measured phenomenon by distinguishing the behavior of the single, double, triple, etc. events in the electronic processor of the chain optimized for this purpose. During the simulation, a determination takes place of an approximate result relative to the quantity, and the simulation result is compared with the measured result. The present invention has particular utility in the measurement of the volume activity of nuclides or radioelements present in a circulating fluid, although other utilities are contemplated.

12 Claims, 3 Drawing Sheets

PROCESS FOR MEASURING A PHYSICAL QUANTITY HAVING A RANDOM AND PULSE-LIKE CHARACTER

BACKGROUND OF THE INVENTION

The present invention relates to a process for measuring a physical quantity with a random, pulse-type character or which can be transformed into pulse form. Particular applications thereof are in gamma spectrometry.

FIELD OF THE INVENTION

The invention more particularly applies to the measurement of the volume activity of nuclides present in a fluid circulating in a pipe. In particular, the invention applies to the determination of the volume activity of nuclides from a pressurized water nuclear reactor enclosure, which has to be opened in the case of an accident in the reactor, said accident resulting from a prolonged interruption of all the electric power supplies of the installation of which the reactor forms part and therefore a prolonged loss of the possibilities of cooling reactor core.

The nuclides which are of interest in such a case are those of gamma ray-emitting nuclides, such as iodine and cesium isotopes. The volume activities of these nuclides can fall within a very wide range of values, which is determined by sets of hypotheses, whereof the effects can be in a ratio of at least three orders of magnitude.

A gamma spectrometry method is used for carrying out the measurement. However, the known gamma spectrometry methods use spectrometry chains or channels, whereof the measuring range is narrow as a result of the fact that in particular in said chains there is a pulse coincidence phenomenon for high count rates and which more particularly occurs at the amplifier in such chains.

Thus, these known methods are unsuitable for a direct, reliable and continuous measurement of the releases or discharges of the reactor enclosure in the case of an accident or incident.

SUMMARY OF THE INVENTION

The present invention is directed at a gamma spectrometry process and a gamma spectrometry chain not suffering from this disadvantage and making it possible to carry out direct, reliable and continuous measurements of the releases and discharges of the reactor enclosure and more generally gamma ray-emitting nuclides, which can have high volume activities.

In more general terms, the invention is directed at a process for measuring a physical quantity with a random, pulse-like character or which is transformable into pulse form (e.g. by shape recognition devices), said quantity leading to a signal which can be superimposed on a high background noise or a known high amplitude signal.

More specifically, the present invention relates to a process for measuring a physical quantity with a random, pulse-like character or which can be transformed into pulse form, characterized in that use is made of a measuring chain provided with detection means followed by electronic means for the processing of the signals from the detection means and which supplies a result relative to said quantity, in that there is an iterative mathematical simulation, whilst taking account in precise manner of the random variable character of the measured phenomenon, by distinction of the behaviour of single, double, triple and possibly higher order events, in electronic means for the processing of the chain optimized for this purpose, whereby during said simulation there is a determination of an approximate result relative to the quantity and the result of the simulation is compared with the result of the measurement and in that the iterations are stopped when convergence occurs.

The term "optimized chain" is understood to mean a chain in which, among the different physical characters (height, shape, surface, etc.) of the pulses available for the treatment, preference is given to that or those making it possible to obtain the sought information.

The present invention more particularly applies to gamma spectrometry. The present invention also relates to a gamma spectrometry process for determining the volume activities of n given gamma ray-emitting nuclides, characterized in that use is made of a gamma spectrometry chain in which are produced pulses due to the gamma photons emitted by the nuclides and in which pulse coincidences are liable to occur, said chain having photoscintillation means and an amplifier able to supply at the output pulses in the form of a substantially isosceles triangle, whose base has a constant time value t and whose surface is proportional to the energy left by the gamma photons in the photoscintillation means, in that, by means of the spectrometry chain, a measurement is carried out leading to a series of n pulse numbers $AI_i$, $1 \leq i \leq n$, said pulses being due to the gamma photons emitted by the nuclides, said n numbers being respectively associated with n adjacent energy intervals, which are themselves respectively associated with n nuclides, in that an iterative mathematical simulation takes place of the behaviour of the spectrometry chain during which a determination takes place of the approximate values $B_i$ of the volume activities, with $1 \leq i \leq n$, and the result of the simulation is compared with the result of the measurement and in that the iterations are stopped when there is a convergence, at least for certain chosen nuclides.

The mathematical simulation takes place on the basis of the following phenomenon: each nuclide i emits gamma photons in the form of a spectrum of clearly defined energy lines and the photoscintillation means subject to said spectrum supply a continuous spectrum $S_i$.

In addition, said simulation is based (a) on the ratios existing between the spectrum of the lines and the continuous spectrum for a given activity of a nuclide, (b) on the physical behaviour of the circuits of the amplifier and (c) on the random variable character of the gamma ray emission of the nuclides.

These three elements (a), (b) and (c) make it possible to respectively define a continuous spectrum $S_i$ received by the amplifier input for a given volume activity of a given nuclide i, a pulse width T called the "elementary sampling time" and sets of single, double, triple, quadruple, etc. pulses relative to T.

The sets of double, respectively triple, quadruple, etc. pulses relative to T is the set of pulses grouped in pairs, or threes, fours, etc., at the amplifier input during a time at the most equal to T.

It is possible to stop the iterations leading to the volume activities when the relative deviation between each number $B_i$ of the final iteration performed and each number $B_i$ of the penultimate iteration performed is below a predetermined value, e.g. 5%, for chosen values of i, the volume activities to be determined then being assumed equal to the numbers $B_i$, $1 \leq i \leq n$, of the final iteration.

According to a preferred embodiment of the process according to the invention, storage takes place beforehand on the one hand for each nuclide of one gamma ray emission spectrum per volume activity unit and which is called the standardized spectrum and which gives a number of pulses per energy channel, expressed in pulses per unit of time (e.g. one second), for adjacent energy channels and on the other hand the probability law giving the probability $P(k)$ of having k pulses during the time T, k assuming integral values starting from 0, and determination takes place of the volume activities by the following stages:

A) the measurement leading to the numbers $A_i$, $1 \leq i \leq n$,

B) a series of iterations is performed, each iteration including:

a) a first phase in which a determination takes place, starting from the n numbers $A1_1, \ldots, A1_n$, the series of n numbers $B_i$, $1 \leq i \leq n$, forming an approximation of the volume activities to be determined and taking account of the COMTON diffusion phenomena and photoelectric peaks relative to the nuclides and b) a second phase in which from each standardized spectrum is formed a homothetic spectrum $S_i$ by multiplying the number of pulses of each channel by the number $B_i$ corresponding to the nuclide associated with said standardized spectrum, the homothetic spectra are added to one another channel by channel, in order to form a spectrum called the pure spectrum S with a non-random character, from said pure spectrum S, on the one hand by grouping the pulses of said pure spectrum in accordance with the n energy intervals, a determination takes place of a series of n pulse numbers $a_i$, $1 \leq i \leq n$, respectively associated with these n energy intervals, on the other hand, taking account of the random character of the radioactivity and by applying to said spectrum the stored probability law, determination takes place of the order k spectra, k here assuming integral values starting from 1, said spectra being homothetic between one another and homothetic of the pure spectrum S, the order k spectrum being the spectrum of the pulses arriving at the amplifier input in a time interval such that they are grouped by k in the amplifier, the maximum value of k being advantageously 3, by mathematical treatment of each order k spectrum, a determination takes place of the output spectra of the amplifier of order k, by addition of these output spectra for each individual energy increment, a calculation takes place of the overall output spectrum of the amplifier for the pure spectrum S at the input of said amplifier and said overall spectrum is grouped in the n energy intervals in order to obtain a series of n other pulse numbers $b_i$, $1 \leq i \leq n$, respectively associated with the n energy intervals and homologs of the numbers $a_i$ and a calculation takes place of the n quantities $A1_i - (a_i - b_i)$ and use is made of these n quantities in the following iteration in order to determine the numbers $B_i$ relative to said following iteration and C) the series of iterations is stopped when there is a convergence at least for certain chosen nuclides.

Preferably, the numbers $B_i$, $1 \leq i \leq n$, are determined in the first phase by a series of iterations using a GAUSS SEIDEL-type method and the iterations of the first phase, leading to the said numbers $B_i$ are stopped when there is a convergence, i.e. for example when, for any i, $1 \leq i \leq n$, the relative deviation between the number $B_i$ obtained in the final iteration and the number $B_i$ obtained in the penultimate iteration is below a given value, e.g. 1%.

The present invention also relates to a gamma spectrometry chain for determining the volume activities of n given gamma ray-emitting nuclides, characterized in that it comprises at least one first assembly constituted by a photoscintillator directly exposed to the gamma radiation of the n nuclides to be measured, a photomultiplier coupled to the photoscintillator, an amplifier for amplifying the signals supplied by the photomultiplier and able to supply at the output pulses shaped like a substantially isosceles triangle, whose base has a constant time value T and whose surface is proportional to the energy left by the gamma photons in the photoscintillation means, a pulse height selector for supplying, on the basis of pulses from the amplifier, information in the form of pulse numbers per energy window, for several adjacent energy windows and electronic processing means for processing the information supplied by the selector and for carrying out said simulation.

Preferably, the first assembly also comprises means for stabilizing the energy response of the gamma radiation as a function of the scintillator temperature, in order to permit a correct operation of the chain at variable temperatures.

Also in preferred manner, the spectrometry chain according to the invention also comprises a second assembly, which is identical to the first, but whose photoscintillator is not directly exposed to the gamma radiation of the nuclides to be measured, the electronic processing means receiving the information from the selectors of the two assemblies and subtracting, window by window, the information from the selector of the second assembly from the information of the selector of the first assembly in order to obtain the numbers $A1_i$, $1 \leq i \leq n$, before carrying out said simulation, in order to be able to compensate the gamma background noise.

Finally, each scintillator is advantageously of NaI(Tl) in order to be able to operate correctly at variable temperatures.

BRIEF DESCRIPTION OF THE DRAWINGS

The invention is described in greater detail hereinafter relative to non-limitative embodiments and the attached drawings, wherein show.

DESCRIPTION OF THE PREFERRED EMBODIMENTS

The present invention more particularly applies to the measurement of the radioactivity of the discharge or release of a sand filter for equipping the enclosure of a pressurized water nuclear reactor (e.g. of the type installed in France), whereby the enclosure of said reactor has to be opened in the case of a long term shutdown of the reactor cooling systems.

The measure according to the invention aims at completing the information resulting from theoretical and experimental studies available when such an enclosure opening procedure is involved. These theoretical and experimental studies make it possible to a priori quantify the significance of the discharge and its consequences for the environment, although a number of uncertainties exist. The latter are linked on the one hand with the values relative to the volume activity of the different isotopes of iodine and cesium present in the atmosphere of the enclosure and on the other the efficiency of the sand filter. The theoretical value of the discharge of rare gases suffers from considerable uncertainty, so that the vital point is to detect the isotopes of iodine and aerosols of various cesium isotopes, whilst eliminating as far as possible the influence, at the detection point, of rare gases and gamma background noise, which is due to the accident and the accumulation of nuclides or radioelements in the sand filter.

It should be noted that the rare gases in the discharge are present in large quantities and give rise to a signal, which interferes with the measurement of the radioisotopes of iodine and cesium.

Moreover, taking account of all the circumstances leading to such a serious accident, it is not possible to use a measuring method requiring a very fine temperature stabilization. Consequently the gamma spectrometry claim is designed to be able to operate at variable temperatures.

Figure 1:
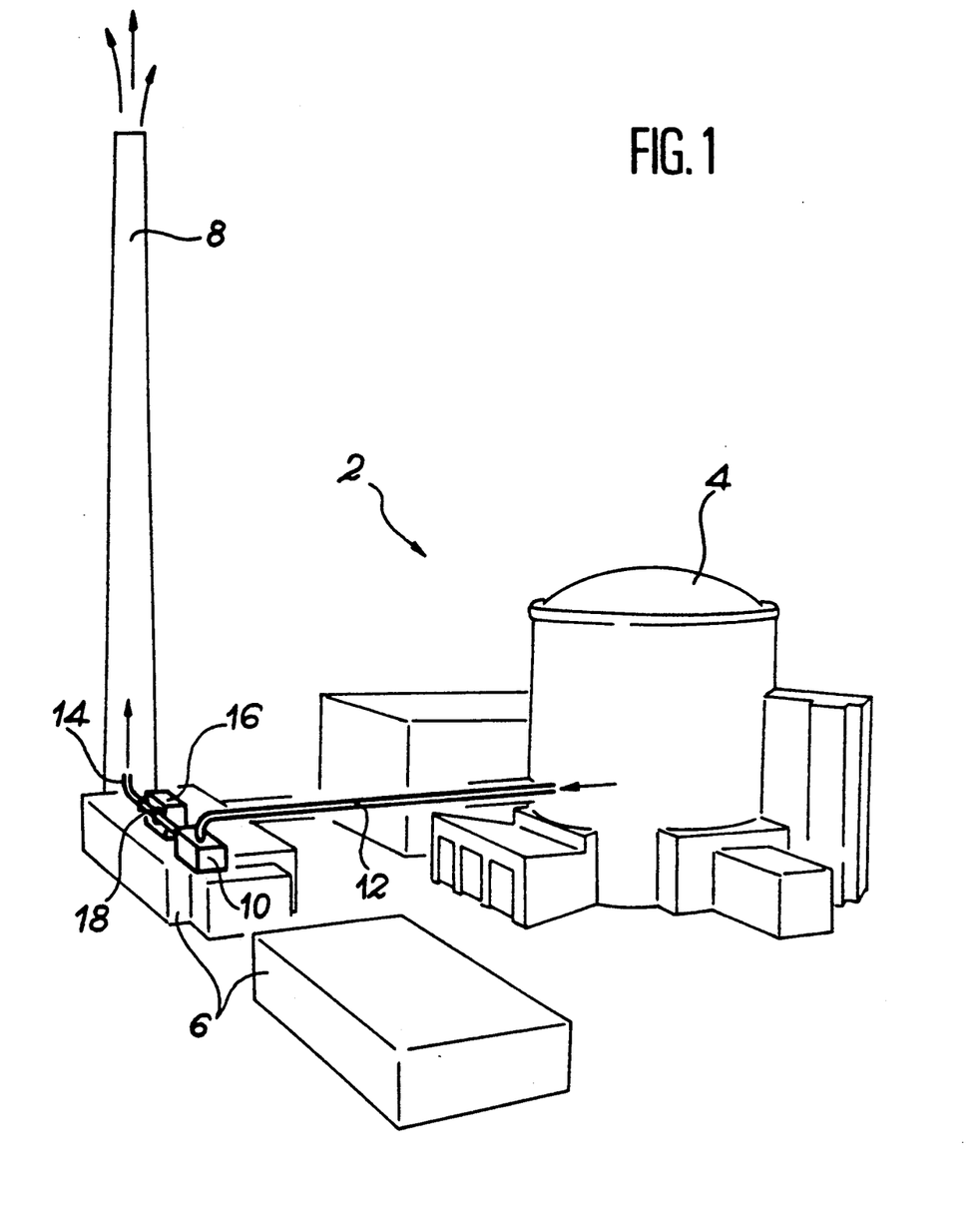
FIG. 1 A diagrammatic view of a nuclear reactor enclosure equipped with a filtration-decompression sand filter.

FIG. 1 diagrammatically shows a nuclear installation 2 with a pressurized water reactor having an enclosure 4 and various buildings 6, as well as a chimney or stack 8 making it possible to carry out gaseous discharges during the normal operation of the reactor. The enclosure is equipped with a device for the filtration and decompression of the atmosphere of the enclosure and which is used in the case of the aforementioned accident. This device has a sand filter 10 located on the roof of one of the buildings 6 and to which leads a duct 12 making it possible, through the opening of not shown valves, to decompress the enclosure. In this case, the enclosure atmosphere is discharged to the sand filter 10, which holds back most of the radioelements or nuclides in the form of enclosure atmosphere-contaminated aerosols. A duct 14 makes it possible to supply the filtered discharge to the chimney 8.

The spectrometry chain used has two measuring probes with sodium iodide scintillators and automatic energy calibration. These probes are e.g. of the type used for the measurement of nitrogen 16 for the monitoring of primary-secondary leaks of steam generators of pressurized water reactors of the type installed in France.

For an ambient temperature between +10° and +60° C., these probes give an energy response stabilized to better than 20 keV between 200 keV and 2.5 MeV. These probes permit spectrometry which is reasonably adapted to the needs of the measurement of activities during the accident in question, the number of nuclides to be identified and measured being limited.

The probes are housed in a shield 16 positioned in the vicinity of the sand filter 10 facing the duct 14. The lead shield 16 greatly attenuates the radiation which would more particularly come from the sand filter in the case of enclosure decompression and this is done in order not to disturb the measurement.

FIG. 1 shows that the duct 14 has a pipe section 18 facing the shield 16. This pipe section 18, which is connected to the remainder of the duct 14 via flanges, has an internal diameter which is as close as possible to that of the remainder of the duct 14. This section is e.g. made from stainless steel and its inner wall is polished.

Figure 2:
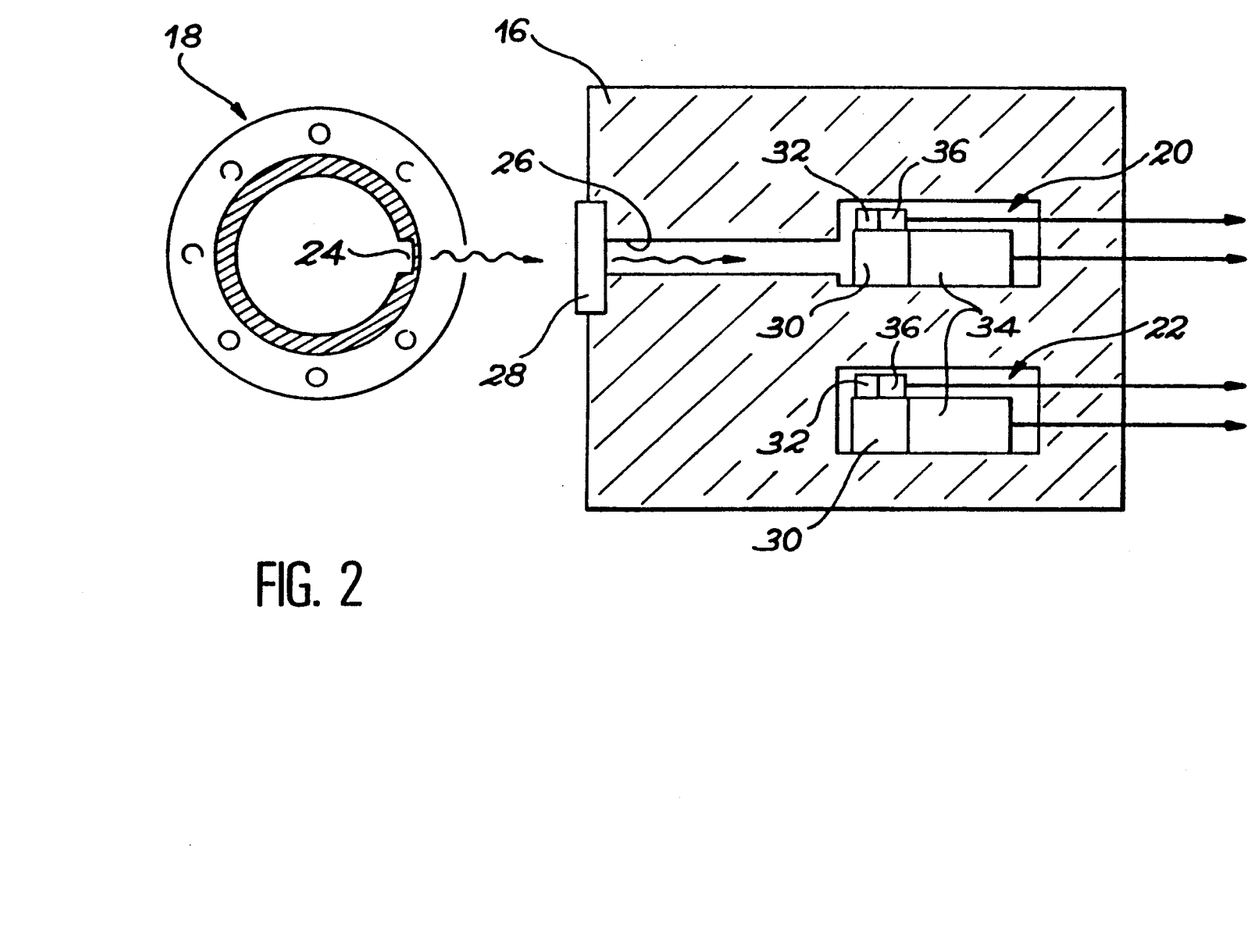
FIG. 2 A diagrammatic view of a shield positioned downstream of the sand filter and within which are located two measuring probes forming part of a spectrometry chain for performing the present invention.

One of the probes, 20 in FIG. 2, is used for the actual measurement, whilst the other probe 22 serves to compensate the gamma background.

The probe 20 is located in the shield 16 facing the pipe section 18. A reduction 24 in the thickness of the wall of said pipe section 18 is provided facing the probe 20 on the one hand in order to control the transmission coefficient of the gamma rays emitted by the nuclides contained in the fluid circulating in the duct 14 and on the other hand in order to maximize the ratio of the transmission coefficient of the gamma photons of iodine 131 (photoelectric peak energy 0.36 MeV) to the transmission coefficient of the gamma photons of the rare gases (photoelectric peak energies 0.08 and 0.24 MeV).

The shield 16 incorporates a collimator 26 between the wall thickness reduction 24 and the measuring probe 20. The diameter of the collimator 26 determines the sensitivity of the measuring probe, the latter being expressed in the number of counter pulses seen by the probe scintillator with respect to the volume activity of the fluid flowing in the pipe section 18. Said diameter is such that, for the maximum volume activity in the section 18, the measuring probe 20 does not suffer any damage.

The thickness of the shield participates in the determination of the low value of the spectrometry chain measuring range. Thus, as will be shown hereinafter, the gamma background signal is subtracted from the signal from the measuring probe 20, for each of the energy windows defined beforehand for the spectrometry chain. The result of the window by window subtraction of the background noise measured by the compensating probe 22 is a random variable, which can be likened to a Gaussian variable. The accuracy of the measurement of the subtraction is therefore directly linked with the number of pulses N1 counted in the window relative to the measurement and the number of pulses N2 counted in the window relative to the compensation. The standard deviation of the result of the difference $N1-N2$ is equal to the square root of $(N1+N2)$ and the relative precision is equal to the square root of $(N1+N2)$ divided by $(N1-N2)$.

Therefore the number N2 must be very small compared with N1, so that the standard deviation is very small compared with $N1-N2$, the value which it is wished to measure and which is the primary quantity of the deconvolution process of the spectrum used in the spectrometry chain according to the invention.

It should also be noted that during the decompression operation of the enclosure, the volume activity to be measured evolves in the reverse direction to the background noise, which is caused by the accumulation of the nuclides in the environment of the area when the measurement is performed.

FIG. 2 also shows that the shield 16 is provided with an e.g. tin screen 28, which is positioned in front of the inlet of the collimator 26 and the wall thickness reduction 24 and which contributes to maximizing the ratio between the transmission coefficient of the gamma photons of iodine 131 and the transmission coefficient of the gamma photons of the rare gases (which are much more abundant in the discharge than iodine 131), by greatly attenuating the dose rate due to the rare gases without excessively reducing the gamma radiation due to the radioisotopes of iodine and in particular iodine 131.

As can be seen in FIG. 2, each of the probes 20 and 22 comprises a sodium iodide scintillator 30, marked by an alpha radiation emitting source 32 (e.g. an Am 241 source), a photomultiplier 34 receiving the light emitted by the scintillator when the latter receives gamma radiation and a temperature probe 36.

Figure 3:
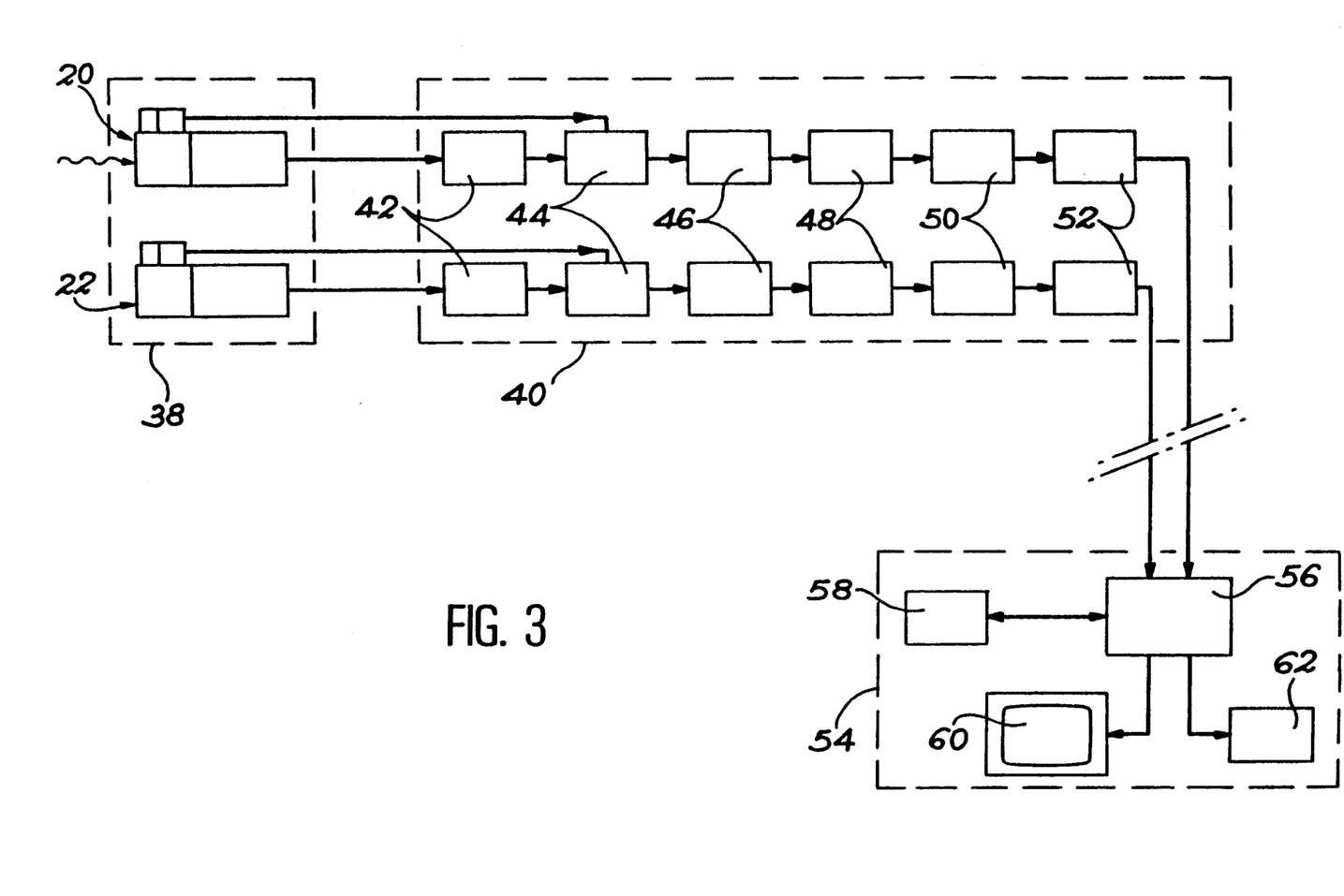
FIG. 3 A diagrammatic view of said spectrometry chain.

As can be seen in FIG. 3, the spectrometry chain used in the present invention comprises, apart from the assembly 38 constituted by the probes 20 and 22, an electronic preprocessing assembly 40, which is placed in a building adjacent to the reactor and at a distance from shield 16. The assembly 40 comprises two identical subassemblies respectively associated with the probes. Each subassembly successively comprises a preamplifier 42, which amplifies the signal from the corresponding photomultiplier, an energy response stabilizing device 44, which receives the signals respectively supplied by the preamplifier 42 and the corresponding temperature probe 36, an amplifier 46, a pulse height selector 48, e.g. with 8 channels or energy windows, a time decoupling register assembly 50 and a synchronous-series connecting means 52.

Each device 44 stabilizes the energy response of the gamma radiation as a function of the temperature of the corresponding scintillator. As a function of said temperature, a microprocessor in the device 44 calculates and controls the gain of the amplifier 46 by measuring the height of the pulses due to the alpha source associated with the scintillator. In the temperature range $+10°$ to $+60°$, centre value of the height of the pulses due to the alpha source corresponds to a photoelectric absorption of gamma radiation of an energy of approximately 3 MeV. The electronic preprocessing assembly 40 also comprises various, not shown, high and low voltage supplies.

FIG. 3 shows that the device 44 acts on the amplifier 46 as a function of the signals which it receivs from the temperature probe 32 and from the preamplifier 42. Each selector 48, as a function of the amplified signals which it receives form the corresponding amplifier 46, supplies a spectrum defined by a number of pulses per second for each of the windows defined in the selector. Thus, a series of numbers is available (8 if there are 8 energy windows).

Therefore the spectrometry chain supplies information supplied to an electronic processing assembly 54. The latter can be located in the reactor control room. As a variant, by using modems and telephone lines, said assembly 54 can be installed in another building on the site where the reactor is located.

The assembly 54 comprises a microcomputer 56 receiving at its input the information (numbers) supplied by the selectors 48, via time decoupling registers 50 and asynchronous-series connection means 52. For each selector 48, a register is associated with an energy window.

The microcomputer 56 is provided with various peripherals, such as a floppy disk unit 58, a video monitor 60 and a printer 62. The microcomputer periodically interrogates the registers of each register assembly 50 and thus receives a series of 8 informations from the selector 48 associated with the measuring probe 20 and a series of 8 informations from the selector associated with the background noise compensating probe 22. The first operation carried out by the microcomputer 56 consists of subtracting window by window the background noise signal corresponding to the probe 22 from the measuring signal corresponding to the probe 20.

The spectrometry chain shown in FIG. 3 makes it possible to carry out the measurements continuously, the microcomputer 56 making it possible to determine at a given instant, the respective volume activities of given radioisotopes which have circulated a certain time beforehand in duct 14 and which is dependent on the calculating speed of the microcomputer and which can e.g. be approximately $\frac{1}{4}$ hour.

The function of each amplifier 46 is to adequately amplify the signal supplied to it by the associated preamplifier 42, via the corresponding device 44, so that said signals can be processed by the associated selector 48. Moreover, each amplifier 46 supplies at the output pulses substantially in the form of an isosceles triangle, whose base is constant and has a value T, e.g. approximately 1 microsecond and whose surface is proportional to the energy corresponding to the input pulses, which leads to output pulses having a height which is proportional to the energy left by the gamma photons in the corresponding scintillator. Such an optimized amplifier can be produced by the Expert. It is pointed out that the two amplifiers 46 are regulated to the same pulse width at base T and to the same effective overall gain.

Within the framework of the measurement according to the invention, the spectrum of the released nuclides B can be considered as known from the qualitative standpoint, the nuclides having been identified. The aim of the measurement performed with the spectrometry chain shown in FIG. 3 is to quantify the spectrum B.

As has already been stated, the first operation performed by the microcomputer 56 consists of subtracting n numbers, representative of the background noise, respectively from n other numbers corresponding to the measurement signal. These numbers are expressed as pulses per second, n being a positive integer equal to 8 in the example given hereinbefore.

As a first approximation, it can be considered that the physical gamma radiation emission phenomenon, the luminescence time of the scintillators, the respective response time of the photomultipliers, preamplifiers and pulse height selectors are extremely small compared with the response time of the amplifiers, which is relatively long. The latter response time, multiplied by the scintillation appearance frequency, leads to the dead time of the amplifiers and therefore to a coincidence phenomenon in said amplifiers. Two pulses which are completely separate at the output of a photomultiplier can be simultaneously amplified and therefore "seen" by the pulse height selector as only forming a single pulse with a relatively complex shape. The consequence of this coincidence phenomenon is to reduce the statistics of the low energy pulses and increase the statistics of the high energy pulses.

As a result of the measurement and once the background noise has been deducted, the microcomputer 56 has n numbers expressed in pulses per second designated $A1_1, A1_2, \ldots, A1_n$ and referred to as the "A1 series".

According to the invention, the microcomputer 56 carries out a deconvolution program for finding a series of n nuclides, whose volume activities, e.g. expressed $Ci/m^3$, constitute a series of n numbers, called the "$B^x$ spectrum", which can be considered as representative of the spectrum B of nuclides present in the duct 14.

Between the A1 series and the spectrum S, there is consequently a considerable deformation, which varies as a function of the frequency of the pulses in the scintillator of each probe and the form or shape of the spectrum S and the deconvolution program must take account of this deformation.

An explanation will now be given of the principle of the deconvolution calculation, which is based on a series of iterations, each iteration having two phases and the iteration stopping criterion is the evolution of the convergence, expressed as a percentage, between two successive iterations.

In an indicative and in no way limitative manner, consideration is given to n=8 windows, numbered 1 to 8 and respectively corresponding to the following energy intervals or ranges: 2.3-2.5 MeV, 1.9-2.3 MeV, 1.05-1.9 MeV, 0.85-1.05 MeV, 0.7-0.85 MeV, 0.44-0.7 MeV, 0.3-0.44 MeV and 0.2-0.3 MeV.

Moreover, in this example, the windows 1 to 8 are respectively associated with the following nuclides: Kr88, Cs138, I135, I132, Cs134, Cs137, I131 and Xe135.

Each window is associated with a monochromatic photoelectric peak, called the "identification peak", corresponding to a nuclide and, in addition, with one or more secondary photoelectric peaks, as well as the COMPTON effect, which corresponds to other nuclides. As will be shown hereinafter, for each window, it is necessary to deduct a number of pulses per second taking account of the secondary photoelectric peaks and the COMPTON effect in order to obtain a corrected pulse number corresponding to the photoelectric identification peak of the nuclide corresponding to said window (said corrections being carried out following the subtraction of the background noise, as stated hereinbefore). The deconvolution calculation takes as the starting point the A1 series.

The first phase of the first iteration is itself a sequence of iterations making it possible, starting from the A1 series, to find approximate values of the volume activities.

It is firstly considered that each number of the A1 series is solely due to the monochromatic photoelectric peak of the corresponding nuclide, which gives a series $B1^1$ of numbers $B1_i^1$, i varying between 1 and n, corresponding to an overestimated spectrum, because no account is taken of the COMPTON effect or the secondary photoelectric peaks.

Then, on the basis of said series $B1^1$ and the window 1, subtraction takes place in the other windows of the numbers of pulses per second corresponding to the COMPTON effect due to the nuclide associated with the window 1, which gives a series $B2^1$ of numbers $B2_i^1$, i varying between 1 and n, corresponding to an underestimated spectrum, because one started with numbers $B1_i^1$ which were too large.

This continues and the same number of iterations is carried out to give series $B3^1$, $B4^1$, etc.

It has been found that the convergence is better than 1% between the series $B4^1$ and $B5^1$ and these iterations can consequently be stopped at series $B5^1$. More specifically, it has been found that the absolute value of $(B5_i^1 - B4_i^1)/B4_i^1$, for all i between 1 and 8, is below 1%.

The series of iterations leading to the series $B5^1$ is in fact the direct application of the GAUSS-SEIDEL method.

This is followed by the second phase of the first iteration. Storage has previously taken place (see hereinafter) of n standardized spectra for $1Ci/m^3$ (standardized spectra of the same nature as the spectrum S) respectively corresponding to the n chosen nuclides. Each standardized spectrum corresponds to an energy interval or range, which is subdivided into energy channels, each energy channel being associated with a number of pulses per second. The energy range in question is between 0 MeV and 2.5 MeV in the example given and each energy channel e.g. has an amplitude of 10 MeV.

In the second phase of the first iteration, for each standardized spectrum, the number of pulses per second of each channel is multiplied by the corresponding number $B5_i^1$ and channel by channel addition takes place of the spectra resulting from these multiplications and from this is obtained a spectrum called the "pure spectrum", designated $S^1$.

On the one hand, grouping takes place of the channels of this pure spectrum into n energy ranges respectively equal to the above-defined windows, which gives n numbers $a1_i$ (in pulses per second) forming a series a1.

On the other hand, a calculation takes place of a series $b_1$ of n numbers $b1_i$, expressed in pulses per second, i varying between 1 and n, said calculation being performed on the basis of the pure spectrum $S^1$ taking account of the coincidences which have taken place as a result of the amplifiers and, to carry this out, use is made of a probability law giving the probability of having a given number of pulses at the input of the amplifiers during a time interval below T. This probability law is approximated by POISSON's law.

For all i varying between 1 and n, a calculation then takes place of the difference $a1_i - b1_i$, which gives an estimate of the disturbance due to coincidences.

This is followed by the calculation of a series of numbers $A2_i$, i varying between 1 and n with:

$$A2_i = A1_i - (b1_i - a1_i).$$

Thus, the first iteration is completed.

This is followed by the second iteration. Starting from numbers $A2_i$, the calculations are recommenced in order to obtain (first phase of the second iteration) numbers $B5_i^2$ (homologs of the numbers $B5_i^1$) and then, in the second phase of the second iteration, the pure spectrum $S^2$ and the numbers $b2_i$ and $A3_i$ with:

$$A3_i = A1_i - (a2_i - b2_i).$$

If necessary, other iterations are carried out, designating $B5^{x-1}$ the spectrum corresponding to the approximate volume activities obtained in the penultimate iteration (of rank x−1) and $B5^x$ the spectrum corresponding to the approximate volume activites obtained in the final iteration (of rank x). The iterations are stopped when the absolute value of the difference $B5_i^x - B5_i^1$, divided by $B5_i^{x-1}$ is below 5% and for several values of i, e.g. for the four indexes i corresponding respectively to the nuclides I131, I132, I135 and Cs134.

It is then considered that the spectrum $B5^x$ represents the spectrum B in duct 14 and the numbers $B5_i^x$, i varying between 1 and n, are printed.

It should be noted that the series a1 is homogeneous with the series which could be obtained by counting if there was no coincidence phenomenon in the amplifiers and if the spectrum in the duct 14 was $B5^1$.

It should also be noted that the series b1 is homogeneous with the series which could be obtained by counting if the spectrum in duct 14 was $B5^1$, taking account of the coincidence phenomena.

It should also be noted that the numbers $a1_i-b1_i$, i varying between 1 and n, are homogeneous with the disturbances due to coincidences and viewed by the pulse height selectors as if the spectrum in the duct 14 was $B5^1$.

Information will be given hereinafter on the first phase of the iterations using the example of the first iteration and assuming n=8.

In the first phase of said first iteration, calculation takes place of the numbers $$B1_i^1 = A1_i/Ci, \ 1 \leq i \leq n$$

in which Ci, $1 \leq i \leq 8$ is the calibration coefficient of the body of the window i, i.e. the total number of pulses per second corresponding to said window i for a volume activity of 1 $Ci/m^3$ (first iteration of the first phase).

Then (second iteration of the first phase), calculation takes place of the numbers $B2_i^1$, $1 \leq i \leq 8$:

$$B2_1^1 = B1_1^1$$
$$B2_2^1 = (A1_2 - (NC_2^1 \cdot B1_1^1))/C2$$
$$B2_3^1 = (A1_3 - (NC_3^1 \cdot B1_1^1) - (NC_3^2 \cdot B1_2^1))/C3$$
...
$$B2_8^1 = (A1_8 - (NC_8^1 \cdot B1_1^1) -$$
$$(NC_8^2 \cdot B1_2^1) - \ldots - (NC_8^7 \cdot B1_7^1))/C8$$

designating $NC_i^j$ the total number of pulses per second corresponding to the window i for the standardized spectrum of the element j.

The iteration of the first phase is as follows:

$$B3_1^1 = B2_1^1$$
$$B3_2^1 = B2_2^1$$
$$B3_3^1 = (A1_3 - (NC_3^1 \cdot B2_1^1) - (NC_3^2 \cdot B2_2^1))/C3$$
...
$$B3_8^1 = (A1_8 - (NC_8^1 \cdot B2_1^1) - \ldots - (NC_8^7 \cdot B2_7^1))/C8$$

The numbers $B4_i^1$, $1 \leq i \leq 8$, obtained during the fourth iteration of the first phase are as follows:

$$B4_i^1 = B3_i^1 \text{ for } i=1, 2, 3$$

$$B4_4^1 = (A1_4 - (NC_4^1 \cdot B3_1^1) - \ldots - (NC_4^3 \cdot B3_3^1))/C4$$

and so on to $B4_8^1$, after which the fifth iteration of the first phase is performed and so on.

Further information will now be given on the manner of quantifying the coincidence between pulses occurring in amplifiers in the case of a high count rate.

On the basis of experimental findings and with the aid of monoenergetic gamma radiation emitting sources, continuous spectra $S_i$ are obtained, which take account of the COMPTON effect and photoelectric peaks. By interpolation and liner transformation, it is possible to accurately construct the spectra obtained for any random gamma emission. It is possible to obtain spectra relative to the given nuclides corresponding respectively to n windows, n being equal to 8 in the example.

For the experimental findings, use is made of source s, whose activity is accurately known and which give rise to a very low count rate, in order to be able to consider as zero the coincidence probability. Moreover, use is made of the spectrometry chain of FIG. 3 for establishing these spectra, replacing the pulse height selector by a pulse analyzer and placing the collimator of FIG. 2 (provided with filter 28) in front of the measuring probe and ensuring the respective correct positioning of these sources in front of said collimator.

The n spectra necessary for the measurement, obtained in the manner which has been explained, are also standardized to 1 $Ci/m^3$ and stored by 10 keV width increments between 0 and 2.5 MeV.

Starting from a spectrum $B^i$ in the pipe, expressed in $Ci/m^3$ and assumed as known, by mathematical simulation the output spectrum of the amplifier will be constructed. On the basis of standardized spectra and individual volume activity values of the nuclides contained in the spectrum $B^i$, by addition construction takes place of an overall spectrum called the "pure spectrum" $S_i$, which is a physical quantity prior to the deformation caused by coincidences in the amplifier, but which is not accessible to the measurement, because the energies of the pulses on leaving a photomultiplier are too low to operate a pulse height selector. This pure spectrum $S_i$ in the above example is formed from 250 numbers representing pulses of height i, j, k, etc.

An analysis will now take place of the coincidence phenomena occurring in the amplifier in the case of a high pulse rate. Account is taken of the random nature of the radioactivity phenomenon and it is considered, in a first approximation, that the probability $P_m(k)$ of having, at the input of an amplifier 46 and in a time interval below T, a number k of pulses is given by the following formula:

$$P_m(k) = e^{-m} \cdot m^k/k!$$

Thus, as a first approximation, use is made of POISSON's law. The number k assumes positive or zero integral values. The number m represents the mean number of pulses relative to the acquisition time T (width at the base of a pulse at the amplifier output). Thus, m is equal to N.T, N representing the sum of the numbers of pulses per second of all the energy channels of the pure spectrum $S_i$.

Thus, each of the numbers $N_i$ respectively contained in the registers $R_i$ of the pure spectrum corresponds to the physical realization of the probability of obtaining or measuring the pulse of height i by single event (k=1) at the amplifier input.

POISSON's law gives the probability of obtaining, by coincidence, another pulse of random height (i, j, k, ...) taken in the spectrum $S_i$, in the time T.

Moreover, if the "two pulse i, j" event occurs, the occupation time of the amplifier is between T (the two pulses being strictly superimposed) and 2T (the two pulses are almost separate) and only the highest pulse is seen by the pulse height selector. Thus, in order to simulate what takes place downstream of the amplifier, it is appropriate to deduct the smallest height pulse, i.e. i if i is below j. In addition, as a first approximation, it is considered that for a large number of events "i+j", the mean occupation time of the amplifier is equal to 1.5 T.

In order that the three pulses of respective height i, j and k are seen as a single pulse by the amplifier, it is necessary for the event i+j to have taken place and for the third pulse to arrive in the time interval 1.5 T. The probability of the appearance of the three events simultaneously in a time T is given by POISSON's law as $m3 = 1.5$ N.T.

Thus, the probability of having three pulses simultaneously in the amplifier is equal to P'(3), such that:

$$P'(3) = (P_m(3)) + (P_m(2) \cdot P_{m3}(3))$$

The same reasoning can be pursued for 4, 5, etc. simultaneous pulses, but the probabilities become very small and are ignored here, k thus being equal to or below 3.

On satisfying the event "three pulses of respective heights i, j, k with i below j, which is itself below k", only the larger pulse (k) is seen at the amplifier output.

When two or three such pulses arrive in a certain time t, they can be placed in time in such a way that the pulse at the amplifier output has a height greater than the greatest of the pulses. As a first approximation, the amplifier producing the pulses with an isosceles triangle shape with a constant base T, the arrival condition of the pulses in time t is that the arrival of the start of the second and third pulses takes place in the first half-base of the isosceles triangle of the first pulse, i.e. t=T/2.

In this case, for two pulses i and j, it is necessary to deduct the pulse j in order to stimulate the amplifier output (i having already been deducted, as stated hereinbefore) and place the resulting pulse "above" j (from the pulse height standpoint). As a first approximation, in this case there is an equal distribution in the energy range from (j+1) to (i+j).

in the case of three pulses i, j and k (i below j, which is below k), it is necessary to reduce the pulse k and distribute the resulting pulse in the range between (k+1) to (k+j+i). Thus, once again an equal distribution is used in this range.

An explanation will now be given of the determination of the output spectrum resulting from the transformation of the pure spectrum $S_i$ by the amplifier. In order to do this, as a first approximation use is made of POISSON's law. It is thus possible to know the number k of pulses occurring at the amplifier input during a chosen sampling time, as well as the average number m of said pulses. By taking as the sampling time, the time T (base width of the pulse at the amplifier output) a mean value m is obtained and by taking as the sampling time half the pulse width at the amplifier output, a means value m' equal to m/2 is obtained.

It is considered that the pure spectrum is a sequence of numbers $X_i$, varying between 1 and 250 in the example given. The pure spectrum is broken down into several sets relative to POISSON's law of mean value m (calculated with T), namely designated respectively $X_0^T$, $X_1^T$, $X_2^T$, $X_3^T$, which are respectively the pulse empty set, the single pulse set, the double pulse set and the triple pulse set (relative to POISSON's law of mean value m). Thus, there is a limitation to $k \leq 3$.

These sets are sequences of numbers designated respectively $X_{0,i}^T$, $X_{1,i}^T$, $X_{2,i}^T$, $X_{3,i}^T$, i varying between 1 and 250 in the example given and it is possible to write, for k varying between 1 and 3:

$$X_{k,i}^T = P_m(k).X_i(k/T)$$

With respect to these sets, the pure spectrum $S_i$ is designated $X^T$. Consideration is also given to the breakdown of the pure spectrum relative to POISSON's law of mean value m' (calculated with T/2), in this case designating the pure spectrum $X^{T/2}$. Relative to m', the pulse empty set, the single pulse set, the double pulse set and the triple pulse set are respectively designated $X_0^{T/2}$, $X_1^{T/2}$, $X_2^{T/2}$, $X_3^{T/2}$.

These sets are sequences of numbers designated respectively $X_{0,i}^{T/2}$, $X_{1,i}^{T/2}$, $X_{2,i}^{T/2}$, $X_{3,i}^{T/2}$, i varying between 1 and 250 in the example given and it is possible to write:

$$X_{k,i}^{T/2} = P_{m'}(k).X_i(k/(T/2))$$

k varying between 0 and 3.

Taking account of the small pulse width at the amplifier input, the sets $X^T$ and $X^{T/2}$ exist physically in the input thereof. It is also considered that the pulse set $X'^T$, which is obtained by the transformation of $X^T$, whilst taking account of the coincidence phenomena in an amplifier and the pulse set $X''^T$ obtained at the amplifier output by the transformation of $X'^T$. By analogy with the breakdown of $X^T$ given hereinbefore, the sets $X'_1^T$, $X'_2^T$ and $X'_3^T$ are defined relative to $X'^T$ and the sets $X''_1^T$, $X''_2^T$ and $X''_3^T$ relative to $X''^T$. Thus, $X'_2^T$ is the set of pulses which, in the amplifier, will have a coincidence by 2 and $X''_2^T$ is the set of pulses which, at the amplifier output, are formed by mixing two pulses in said amplifier. An explanation will be given hereinafter as to how $X_k^T$ is transformed into $X'_k^T$ and $X'_k^T$ into $X''_k^T$.

As has been stated, it is considered that the occupation of the amplifier for a double pulse is approximately 1.5 T and for a triple pulse approximately 2T.

The time available in the amplifier for the pulses $X_{1,i}^T$ is no longer $X_{1,i}^T.T$, but:

$$r = X_{1,i}^T.T - 0.5(K.X_{2,i}^T.0.5T)$$

with: $K = P_m(1)/(P_m(0)+P_m(2)+P_m(3))$.

This leads to a counting loss for the sets $X_1^T$, $X_0^T$ and $X_2^T$ and a counting gain for the set $X_3^T$. Thus, when a single pulse arrives during the occupation of the amplifier by a double pulse, there is simultaneously a loss of a single pulse (one pulse loss), a loss of a double pulse (two pulse loss) and the creation of a triple pulse (three pulse gain).

It is therefore possible to write, no matter what is i, $1 \leq i \leq 250$:

$$X'_{1,i}^T = X_{1,i}^T.r/(T.X_{1,i}^T)$$

i.e.: $X'_{1,i}^T = X_{1,i}^T - 0.25K.X_{2,i}^T$ $$X'_{3,i}^T = X_{3,i}^T + 3(X_{1,i}^T - X'_{1,i}^T)$$

The same phenomenon occurs with the set $X_2^T$ for which part of the events disappears to the advantage of set $X'_3^T$. This involves the same number of events as that which modifies $X_1^T$ and consequently one obtains:

$$X'_{2,i}^T = X_{2,i}^T - 2(X_{1,i}^T - X'_{1,i}^T)$$

With regards to the transformation of $X'_1^T$ and $X''_1^T$, by definition, the set $X'_1^T$ is obtained by starting with the $X_1^T$ and by removing the coincidence events with the set $X_2^T$. The pulses of the set $X'_1^T$ pass through the amplifier without interference, so that $X''_{1,i}^T$ is identical to $X'_{1,i}^T$.

With regards to the transformation of $X'_2^T$ into $X''_2^T$, due to the random nature of the radioactivity emission phenomenon and the photoscintillator efficiency, a given pulse of the set $X'_2^T$, of height i, only intervenes in the order 2 coincidences proportionally to its presence in the set $X'_2^T$. This also applies regarding the pulses of respective heights i, j, k, etc.

The number of "interference of a pulse of height i with a pulse of height j events" (i<j) is consequently:

$$n_{ij} = n_i n_j / s \text{ if } i < j$$

with $n_i = X'_{2,i}{}^T$ and $n_j = X'_{2,j}{}^T$ s: total number of pulses in set $X'_2{}^T$.

Whenever the interference i.j occurs, with i<j, the pulse of height i disappears and the amplifier transmits at its output a pulse of height at least equal to j and below i+j. When the "interference i.i" event occurs, the amplifier only transmits a single pulse with a height at least equal to i and below i+i. Therefore, for pulse pairs of type jj, kk, ll, etc., the frequency of the pulses is half (one pulse only being used once), so that one obtains:

$$n_{ii} = n_i n_i / (2s).$$

With regards the distribution between the transmitted pulses, either the largest pulse, or a pulse greater than the largest, only the events corresponding to a coincidence in a time interval below T/2 give pulses larger than the largest pulse.

It is accepted that the distribution ratio is equal to $X_2{}^{T/2}/X'_2{}^T$. For the distribution in the spectrum $X''_2{}^T$, it is considered that there is an equal distribution of each number $n_{ij}$ calculated in the classes ranging from energy class j+1 to energy class i+j for the coincidence events in an interval below T/2.

An example of a calculation table for the numbers $n_{ij}$ is given at the end of the present description. In this example, it is assumed that the total number of pulses in the set $X'_2{}^T$ is equal to 100 and that there are nine energy classes and not 250 and that the energy classes are obviously arranged with increasing values i, j, k, etc. with i<j<k< etc. Thus, for example, the class of rank 1 contains 20 pulses and the class of rank 9 contains 10 pulses.

The table in question has been completed using the aforementioned $n_{ij}$ calculation formulas.

In order to form the set $X''_2{}^T$, the value $n_{ij}$ contained in each box is multiplied by the ratio R of the total number of pulses of $X_2{}^{T/2}$ to the total number of pulses of $X'_2{}^T$ and the result obtained is equally distributed from the energy class (j+1) to the energy class (i+j). In other words, in each of the classes (j+1) and (i+j) is placed the quantity $R.n_{ij}/i$ (i being taken here as the class number). The quantity $n_{ij}(1-R)$ is placed in energy class j.

Thus, in the said table and e.g. assuming that the total number of pulses in $X_2{}^{T/2}$ is here 30, R is equal to 30/100=0.3. Thus, by e.g. taking $n_{ij} = n_{(3)(5)} = 1$, one calculates:

$$n_{ij} R / i = 0.3/3 = 0.1.$$

This value appears in classes 6, 7 and 8 and the compliment, i.e. 1-0.3=0.7, appears in class 5.

For the transformation of $X'_3{}^T$ into $X''_3{}^T$, the following procedure is adopted. $X''_3{}^T$ has one third of the pulses of $X'_3{}^T$. Thus, by abstraction, subsets of 3 pulses are obtained. The number of these subsets is equal to the number of pulses at the output, i.e. one third of the pulses of $X'_3{}^T$. In a first stage of the calculation, starting from ⅓ of the pulses of $X'_3{}^T$, a determination takes place of the numbers of type $n_{ij}$ (subsets not completely filled incorporating pulse pairs i,j), by the method used for the transformation of $X'_2{}^T$ into $X''_2{}^T$:

$$n_{ij} = (\tfrac{1}{3})X'_{3,i}{}^T.(\tfrac{1}{3})X'_{3,j}{}^T/s' \text{ if } i < j, \text{ and}$$

$$n_{ii} = (\tfrac{1}{3})X'_{3,i}{}^T.(\tfrac{1}{3})X'_{3,i}{}^T/(2s')$$

the number s' being ⅓ of the total number of pulses of $X'_3{}^T$.

In a second stage, each box containing a number $n_{ij}$ is used as a basis for the calculation of the distribution of a third of the pulses of $X'_3{}^T$ which remain in order to obtain the numbers $n_{ijk}$:

$$n_{ijk} = n_{ij}.(\tfrac{1}{3})X'_{3,k}{}^T/s''$$

s'' being equal to a third of the total number of pulses of $X'_3{}^T$.

Due to the fact that each of the indexes i,j,k varies between 1 and I with I=250 in the example chosen hereinbefore, the number of elementary operations is very high and, taking account of the low value of the number of pulses of $X'_3{}^T$, it is possible to choose, for the determination of $X''_3{}^T$, a distribution into n classes, whose limits correspond to those of the n windows of the pulse height selector (n=8 in the aforementioned example). The energy positioning in the spectrum of the complex pulses i,j,k of $X''_3{}^T$ uses the same reasoning as for the complex pulses i+j of $X''_2{}^T$, namely the use of the coefficient R', ratio of the total number of pulses of $X_3{}^{T/2}$ to the total number of pulses of $X'_3{}^T$ and an equal distribution: for each non-zero number $n_{ijk}$, one calculates $n_{ijk};R'/(i+j-1)$, which is placed in the channels (k+1) to (k+j+i) of $X''_3{}^T$ and one calculates $n_{ijk}.(1-R')$, which is placed in the channel k of $X''_3{}^T$. Thus, a grouping takes place of the 250 numbers of each of the spectra $X''_1{}^T$ and $X''_2{}^T$ into n numbers respectively associated with the n energy windows. This is followed by the window by window addition of the spectra $X''_1{}^T$, $X''_2{}^T$ and $X''_3{}^T$ in order to obtain a series such as the aforementioned series b1.

In order to develop the reasoning, use has been made of a number of approximations, namely the negligible luminescence time of the scintillator, the probability law approximated by POISSON's law and the notion of the equal distribution of the composite pulses.

Thus, in order to optimize the complete measuring chain and in particular the measuring range and its accuracy, a very fine experiment has been carried out which makes it possible to experimentally define on the one hand the different sets $X'_1{}^T$, $X'_2{}^T$, $X'_3{}^T$ and on the other hand the ratios R, R', as well as the distribution laws of the composite pulses. This information is obtained experimentally for different count rates of the measuring probe and is stored for use as correctional coefficients for the spectrum simulation calculation program.

Obviously, the invention is not limited to gamma spectrometry. It more generally applies to studies such as of "parasitic" signals in a main known signal, or the analysis of the signals superimposed on a known signal or a background noise (which can be very high), provided that it is possible to determine the probability laws of the random variables constituting these various signals.

TABLE

| | | i | | j | | k | (i<j<k...) | | |
|---|---|---|---|---|---|---|---|---|---|
| $X'_2{}^T$ | 20 | 10 | 10 | 10 | 10 | 10 | 10 | 10 | 10 100 |
| 20 | 2 | 2 | 2 | 2 | 2 | 2 | 2 | 2 | 2 18 |
| 10 | | 0.5 | 1 | 1 | 1 | 1 | 1 | 1 | 1 7.5 |
| i 10 | | | 0.5 | 1 | 1 | 1 | 1 | 1 | 1 6.5 |
| 10 | | | | 0.5 | 1 | 1 | 1 | 1 | 1 5.5 |
| j 10 | | | | | 0.5 | 1 | 1 | 1 | 1 4.5 |
| 10 | | | | | | 0.5 | 1 | 1 | 1 3.5 |
| k 10 | | | | | | | 0.5 | 1 | 1 2.5 |
| 10 | | | | | | | | 0.5 | 1 1.5 |
| 10 | | | | | | | | | 0.5 0.5 |
| | 2 | 2.5 | 3.5 | 4.5 | 5.5 | 6.5 | 7.5 | 8.5 | 9.5 50 |

Rows 1–9 bracketed as group II; bottom row labeled I.

I: number of pulses transmitted at the amplifier output.
II: number of pulses lost in the amplifier.

We claim:

1. A process for determining volume activities of n given gamma ray-emitting nuclides, and comprising, using a gamma spectrometry chain in which are produced electrical signal pulses due to the gamma photons emitted by the nuclides and in which pulse coincidences are liable to occur, said chain having photoscintillation means and an amplifier able for supplying at the output electrical signal pattern pulses in the form of a substantially isosceles triangle, whose base has a constant time value T and whose surface is proportional to the energy left by the gamma photons in the photoscintillation means, carrying out a measurement by means of the spectrometry chain leading to a series of n pulse numbers $A1_i$, $1<i<n$, said pulses being due to the gamma photons emitted by the nuclides, said n numbers being respectively associated with n adjacent energy intervals, which are themselves respectively associated with n nuclides, and performing an interative mathematical simulation to produce additional electrical signal patterns representative of the expected behavior of the spectrometry chain, during which simulation a determination takes place of the approximate values $B_i$ of the volume activities, with $1<i<n$, and comparing said additional electrical signal patterns with the pulse numbers of the measurement, the iterations being stopped when there is a convergence, at least for certain chosen nuclides.

2. A process according to claim 1, and including the step of storing beforehand, for each nuclide, of a gamma emission spectrum per volume activity unit, which is called the standardized spectrum and which give a number of pulses per energy channel, expressed in pulses per time unit, for adjacent energy channel and also storing a mathematical probability law for giving a probability P(k) of having k pulses during the time T, k assuming integral values starting from 0 and wherein the volume activities are determined by the following steps:

the measurement leading to the number $A1_i$, $1<i<n$ is carried out and a series of iterations is carried out, each iteration involving: a first phase in which determination takes place, starting from n numbers $A1_1, \ldots, A1_n$, of the series of n numbers $B_i$, $1<i<n$, forming an approximation of the volume activities to be determined and taking account of COMPTON diffusion phenomena and photoelectric peaks relative to the nuclides and
a second phase in which
from each standardized spectrum is formed a homothetic spectrum, by multiplying the number of pulses of each channel by the number $B_i$ corresponding to the nuclide associated with said standardized spectrum,
the homothetic spectra are added to one another channel by channel to form a pure spectrum having a non-random nature,
the pulses of said pure spectrum are grouped in accordance with n energy intervals or ranges to obtain a series of n pulse numbers $a_i$, $1<i<n$, respectively associated with said n energy intervals, on the basis of the pure spectrum and taking account of the coincidences liable to occur in the spectrometry chain and using for this purpose the stored probability law, determination takes place of a series of n other pulse numbers $b_i$, $1<i<n$, respectively associated with the n energy intervals and which are homologs of the numbers $a_i$ and
the n quantities $A1_i-(a_i-b_i)$ are calculated and these n quantities are used in a following mathematical simulation to determine the numbers $B_i$ relative to said following mathematical simulation and
the series of iterations is stopped when convergence occurs, at least for certain chosen nuclides.

3. A process according to claim 2, wherein the numbers $B_i$, $1<i<n$, are determined by a series of iterations using a method of the GAUSS-SEIDEL type and the iterations leading to said numbers $B_i$, are stopped when a convergence occurs.

4. A process according to claim 2, wherein the numbers $b_i$ are determined by breaking down the pure spectrum into pulse sets $X^T{}_k$ arriving grouped by k at the amplifier input for a time less than T, k assuming integral values starting from 0, by determining by the stored probability law and for $k>1$, the set $X''^T{}_k$ resulting from the transformation by the amplifier of each set $X^T{}_k$ and by adding the thus determined sets $X'''^T{}_k$.

5. A process according to claim 4, wherein k may assume a maximum value of 3.

6. A process according to claim 5, wherein the sets $X''^T{}_1$, $X''^T{}_2$ and $X''^T{}_3$ are determined in the following way:

the sets $X'^T{}_1$, $X'^T{}_2$ and $X'^T{}_3$ are determined and their components are respectively designated $X'^T{}_{1,i}$, $X'^T{}_{3,i}$ for each energy channel i, with:

$$X^T{}_{1,i}=X^T{}_{1,i}-0.25K \cdot X^T{}_{2,i}$$

$$X^T{}_{2,i}=X^T{}_{2,i}-2(X^T{}_{1,i}-X^T{}_{1,i})$$

$$X^T{}_{3,i}=[X^T{}_8]X^T{}_{3,i}+3(X^T{}_{1,i}-X^T{}_{1,i})$$

$X''^T{}_{1,i}$ is assumed equal to $X'^T{}_{1,i}$,
the set $X''^T{}_2$ is formed by calculating, for all the energy channels
i, j with $i<j$, the number $n_{ij}$ such that:

$$n_{ij}=(X^T{}_{2,i}) \cdot (X^T{}_{2,j})/s \text{ if } i<j$$

$$n_{ij}=(X^T{}_{2,i}) \cdot (X^T{}_{2,j})/(2s) \text{ if } i=j$$

in which s is the total number of pulses in the set $X'^T{}_2$ and then by placing in the energy channels (j+1) to (i+j) of $X''^T{}_2$, the number $R \cdot n_{ij}/i$ and in the channel j of $X''^T{}_2$ the number $(1-R) \cdot n_{ij}$, R being equal to the total number of pulses of $X^T{}_2{}^{/2}$ divided by the total number of pulses of $X'^T{}_2$, the set $X''^T{}_3$ is formed by calculating, for all the energy channels i,j with $i<j$, the numbers $n_{ij}$ such that:

$$n_{ij} = ((\tfrac{1}{3}X^{T_3},i) \cdot ((\tfrac{1}{3})X^{T_3},j))/s' \text{ if } i<j$$

$$n_{ij} = ((\tfrac{1}{3})X^{T_3},i) \cdot ((\tfrac{1}{3})X^{T_3},j)/(2s') \text{ if } i=j$$

in which s' is equal to ⅓ of the total number of pulses in the set $X'^{T_3}$, and then calculating, for all the energy channels i, j, k with i<j<k, the numbers $n_{ijk}$ such that:

$$n_{ijk} = n_{ij} \cdot ((\tfrac{1}{3})X^{T_3},k)/s''$$

s" being equal to one third of the total number of pluses of the set $x'^{T_3}$ and then placing in the energy channels (k+1) to (k+j+i) of $X''^{T_3}$ the number $R'n_{ijk}/(i+j-1)$ and in the channel k of $X''^{T_3}$ the number $(1-R') \cdot n_{ijk}$ R' being equal to the total number of pulses of $X^{T_3/2}$ divided by the total number of pulses of $X'^{T_3}$, the sets $X^{T_2/2}$ and $X^{T_3/2}$ being components of the pure spectrum, respectively homologs of $X^{T_2}$ and $X^{T_3}$, but defined on the basis of the value T/2 instead of T.

7. A process according to claim 6, wherein at least the set $X''^{T_3}$ is formed by taking, as energy channels, the n energy intervals.

8. Process according to claim 7, wherein the number of energy channels exceeds n and in that the numbers of each of the sets $X''^{T_2}$ are grouped into n numbers respectively associated with the n energy intervals before adding the sets $X''^{T_1}$, $X''^{T_2}$ and $X''^{T_3}$.

9. A gamma spectrometry chain for carrying out the process of claim 1, comprising at least on first assembly comprising a scintillator directly exposed to the gamma radiation of the nuclides to be measured, a photomultiplier coupled to the scintillator, an amplifier for amplifying the signals supplied by the photomultiplier, a pulse height selector for supplying, on the basis of pulses form the amplifier, information in the form of pulse numbers per energy window for several adjacent energy windows and an electronic processing means for processing the information supplied by the selector wherein said amplifier is supplied at the output pulses shaped as a substantially isosceles triangle, whose base has constant time value T and whose surface is proportional to the energy left by the gamma photons in the photoscintillation means, said electronic processing means also carrying out said simulation.

10. A gamma spectrometry chain according to claim 9, wherein the first assembly also incorporates means for stabilizing the energy response of the gamma radiation as a function of the temperature of the scintillator.

11. A gamma spectrometry chain according to claim 9, and also comprising a second assembly, which is identical to the first, but whose scintillator is not directly exposed to the gamma radiation of the nuclides to be measured, the electronic processing means receiving information from the selectors of the two assemblies and subtracting window by window the information from the selector of the second assembly from the information from the selector of the first assembly in order to obtain the numbers $A1_i$, $1<i<n$, before carrying out said simulation.

12. A gamma spectrometry chain according to claim 9 wherein each scintillator is of NaI(T1).

* * * * *

UNITED STATES PATENT AND TRADEMARK OFFICE
CERTIFICATE OF CORRECTION

PATENT NO. : 5,262,947
DATED : November 16, 1993
INVENTOR(S) : Boudan et al

It is certified that error appears in the above-indentified patent and that said Letters Patent is hereby corrected as shown below:

Col. 18, line 43, after "$X'^{T}_{1,i}$" insert --$X'^{T}_{2,i}$ and--.

Col. 19, line 27, after "sets" insert --$X''^{T}_{1}$ and--.

Signed and Sealed this

Fourteenth Day of June, 1994

Attest:

BRUCE LEHMAN

Attesting Officer     Commissioner of Patents and Trademarks